1

3,217,039
1,4-BIS(SUBSTITUTED-BENZYLAMINOMETHYL)
CYCLOHEXANES
Leslie G. Humber, Montreal, Quebec, Canada, assignor to American Home Products Corporation, New York, N.Y., a corporation of Delaware
No Drawing. Filed July 30, 1963, Ser. No. 298,600
7 Claims. (Cl. 260—570.5)

This application is a continuation-in-part of my copending patent application, S.N. 168,828, filed January 25, 1962, and now U.S. Patent No. 3,168,563.

This invention relates to agents which affect lipid metabolism and to their preparation.

More particularly, my invention relates to certain new chemical compounds, derivatives of di-substituted aralkylaminoalkyl cyclohexanes, as well as to acid addition salts of these new chemical compounds, particularly the hydrohalide salts. It is also concerned with their preparation from available starting materials.

In base form, the novel chemical compounds to which this invention is directed may be represented by the generic structural formula:

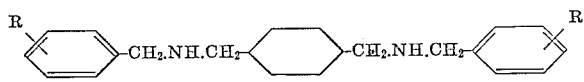

wherein R represents hydrogen, lower alkyl, lower alkoxy, halogen, di(lower alkyl)amino, lower acylamino, hydroxy, amino, nitro, trihalomethyl or methylthio. Where R represents a substituent other than hydrogen, its position may be ortho, meta, or para, with respect to the methylene group by which the benzene ring is attached to the nitrogen in the above formula.

The compounds of this invention, both in the form of the free bases and of salts with pharmacologically acceptable acids, are valuable as pharmacological agents, inhibiting the biosynthesis of cholesterol in vitro and lowering blood cholesterol levels in vivo.

It is well-known that high serum cholesterol levels are injurious to arterial tissue and that such injuries may be one of the causes of coronary heart disease (see, e.g., Gould, Symposium on Atherosclerosis, Publication No. 338 of the National Academy of Sciences, National Research Council, 1955; Jolliffe, Circulation, vol. XX, July 1959, page 121; or Keyes, Jourmnal of Chronic Diseases, vol. 4, 1956, page 364). It is equally well-known that the degree and duration of hypercholesteremia are the two main determining factors in the development of experimental atherosclerosis (see Adlersberg and Sobotka, "Cholesterol" Academic Press, N.Y., 1958, p. 405).

The connection between in vitro inhibition of cholesterol biosynthesis as demonstrated e.g. on a liver homogenate, the cholesterol level lowering activity in laboratory animals, e.g. rats or rabbits, and clinical efficacy is an equally well-established fact. The drug Triparanol, or MER–29 (1-(4-diethylaminoethoxyphenyl)-1-(p-tolyl)-2-(p-chlorophenyl)-ethanol, has been shown to inhibit cholesterol biosynthesis in vitro (see Holmes, Chemical and Engineering News, April 10, 1961, page 45), to lower cholesterol levels in the rat (see Blohm and MacKenzie, Archives of Biochemistry and Biophysics, vol. 85, 1959, page 245), and to be a clinically effective agent for lowering cholesterol levels in humans (see Oaks, Lisan and Moyer, American Medical Association Archives of Internal Medicine, vol. 104, 1959, page 527).

In a similar correlation, nicotinic acid has been shown to inhibit cholesterol biosynthesis in vitro (see Gamble and Wright, Proc. Soc. Exp. Biol. Med., vol. 107, 1961, page 160), to lower cholesterol levels in the rabbit (see Merrill and Lemley-Stone, Circulation Research, vol. IV, 1957, page 617), and to be a clinically effective drug for lowering serum cholesterol levels in humans (e.g. Achor, Berge, Barker, and MacKenzie, Circulation, vol. 17, 1958, page 497).

The compounds of this invention are effective in inhibiting the biosynthesis of cholesterol in vitro by 76 percent in molar concentrations of $1 \times 10^{-4}$ to 90 percent at molar concentrations of $1 \times 10^{-6}$. They are equally effective in lowering cholesterol levels in the rat by 53 percent to 62 percent when administered by s.c. injection in doses of 25–75 micromoles per kilogram. They are also effective when administered orally, doses of 25 micromoles per kilogram lowering cholesterol levels in the rat by about 60 percent.

The new chemical compounds of this invention are useful as agents for lowering serum cholesterol levels.

Furthermore, the compounds of this application are useful as anti-bacterial agents. As such they have been found to inhibit gram positive organisms such as Staph. pyogenes (both penicillin sensitive and penicillin resistant strains), Sarcina lutea, and Strept. faecalis, and gram negative organisms such as E. coli No. 198, Aer. aerogenes, Ps. aeruginosa, Pr. mirabilis and Pr. vulgaris at concentrations from 1:1000 to 1:32,000.

The compounds of this invention may be conveniently prepared by heating 1,4-bis(aminomethyl)-cyclohexane with two molar equivalents of an aromatic aldehyde, such as benzaldehyde, or with suitably substituted benzaldehydes, and removing two molecules of water from the reaction mixture. The resulting benzylidene, or substituted benzylidene, derivative (a Schiff base) may then be reduced to the corresponding secondary amino derivative by treatment with a reducing agent, such as, for example, by treatment with sodium borohydride; hydrogen and platinum oxide; or lithium aluminum hydride. The resulting 1,4-bis(benzylaminomethyl)-cyclohexane, or 1,4-bis-(substituted benzylaminomethyl)-cyclohexane, may then be converted to a suitable acid addition salt by conventional means. For example, the hydrochloride salts may be readily obtained by treatment of the base with hydrogen chloride in ether solution.

This sequence of reactions may be indicated schematically as follows:

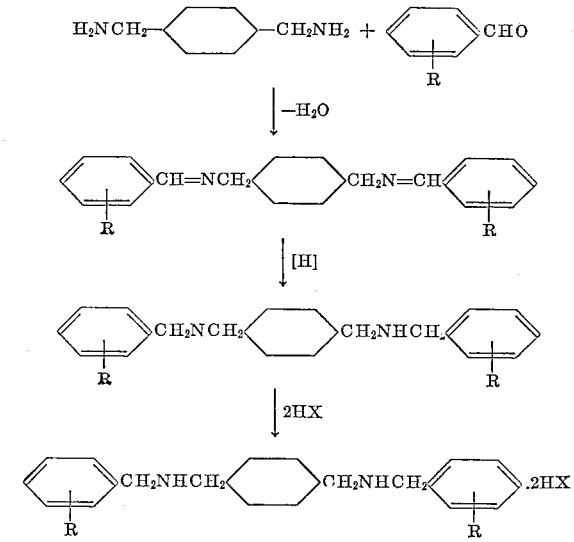

where X represents a pharmacologically acceptable anion.

Alternatively, some of the compounds of this invention may be prepared by processes other than that described above. For example, 1,4-bis-(aminomethyl)-cyclohexane or a cyclohexane-1,4-dicarbonyl halide may be reacted respectively with a suitable benzoyl halide or benzylamine using the well known conditions of the Schotten-Baumann reaction, to yield diamides which are then reduced, by a suitable reducing agent, to yield the compounds of this invention. For further example, a suitably disubstituted cyclohexane such as 1,4-di-(methanesulfonylmethyl)-cyclohexane or a 1,4-di-(halomethyl)-cyclohexane may be used to alkylate a suitable benzylamine, thus yielding the compounds of this invention.

EXAMPLE 1

1,4-bis-(benzylaminomethyl)-cyclohexane (a) 1,4-bis-(aminomethyl)-cyclohexane (28.4 gm., 0.2 mole) and benzaldehyde (42.45 gm., 0.4 mole) were combined in anhydrous benzene and heated to reflux. When the theoretical amount of water had been collected in a Dean-Stark trap (3–4 hours), the solution was cooled and evaporated to leave a viscous oil which was dissolved in methanol (150 ml.). Sodium borohydride (15.4 gm.) was added portionwise to the solution at such a rate that the vigorous reaction could be controlled by cooling. After all the borohydride was added, the mixture was refluxed for three hours. The methanol was removed by distillation and the residue distributed between water and ether. The ethereal solution was washed well with water, dried and evaporated to yield the title compound as a viscous oil, $\lambda$ max. 247 m$\mu$, $\epsilon$=274; 253 m$\mu$, $\epsilon$=343; 259 m$\mu$, $\epsilon$=408; 265 m$\mu$, $\epsilon$=306. The dihydrochloride was prepared by dissolving the free base in ether and treating with two equivalents of hydrogen chloride in ether. The precipitated dihydrochloride was crystallized from ethanol and had M.P. 358° C. (decomp.). It was the pure trans isomer. The pure cis isomer had M.P. 307° C. Analysis confirmed the empirical formula $C_{22}H_{32}N_2Cl_2$.

(b) 1,4-bis-(aminomethyl)-cyclohexane (7.1 gm.) and benzoyl chloride (17.5 gm.) were converted to 1,4-bis-(benzoylaminomethyl)-cyclohexane under the conditions of the Schotten-Baumann reaction. It had M.P. 263–265° C. and the empirical formula $C_{22}H_{26}N_2O_2$ was confirmed by analysis. The above diamide (14.0 gm.) was suspended in tetrahydrofuran and refluxed with lithium aluminum hydride (2.5 gm.) for 18 hours. The excess reagent was destroyed with water and the organic layer evaporated to yield 1,4-bis-(benzylaminomethyl)-cyclohexane identical in properties to the trans isomer described above. The dihydrochloride salt was prepared and was identical to the trans-dihydrochloride described above.

EXAMPLE 2

1,4-bis-(o-methylbenzylaminomethyl)-cyclohexane 1,4-bis-(aminomethyl)-cyclohexane (14.2 gm., 0.1 mole) and o-tolualdehyde (0.2 mole) were combined in benzene and refluxed until the theoretical quantity of water had been removed azeotropically. The benzene was removed and the resulting dark oil was dissolved in methanol and treated portionwise with sodium borohydride (3.6 gm.). The reduction product was worked up as previously described to yield the title compound as a light yellow oil which solidified on standing at room temperature. $\lambda$ max. 263 m$\mu$, $\epsilon$=535; 272 m$\mu$, $\epsilon$=408.

The dihydrochloride was prepared by treating the free base with ethereal hydrogen chloride. It was crystallized from a methanol-ether mixture and had M.P. 320° C. (decomp.). Analysis confirmed the empirical formula $C_{24}H_{36}N_2Cl_2$.

EXAMPLE 3

1,4-bis-(o-methoxybenzylaminomethyl)-cyclohexane 1,4-bis-(aminomethyl)-cyclohexane (14.2 gm., 0.1 mole) and o-methoxybenzaldehyde (0.2 mole) were refluxed in benzene until the theoretical quantity of water had been removed azeotropically. The resulting Schiff base was isolated, dissolved in methanol, and treated with sodium borohydride (3.7 gm.) and worked up in the usual manner to yield the compound as an oil, $\lambda$ max. 273 m$\mu$, $\epsilon$=4200; 280 m$\mu$, $\epsilon$=3940.

The dihydrochloride was prepared as previously described. It was crystallized from ethanol and had M.P. 250–252° C. Analysis confirmed the empirical formula $C_{24}H_{36}O_2N_2Cl_2$.

EXAMPLE 4

1,4-bis-(o-chlorobenzylaminomethyl)-cyclohexane (a) 1,4-bis-(aminomethyl)-cyclohexane (0.1 mole) and o-chlorobenzaldehyde (0.2 mole) were refluxed in benzene for six hours. The Schiff base was obtained as a solid precipitate. It was separated by filtration, dried and suspended in methanol. Sodium borohydride (6.5 gm.) was added portionwise to the suspension and as the double bonds were reduced, the product went into solution. The clear solution was refluxed for three hours and the title compound was isolated as previously described. It was an oil which solidified on standing at room temperature, $\lambda$ max. 285 m$\mu$, $\epsilon$=463; 264 m$\mu$, $\epsilon$=487; 273 m$\mu$, $\epsilon$=311 and was a mixture of cis and trans isomers. The pure trans isomer had M.P. 101–103° C. and the pure cis isomer was an oil. The dihydrochloride salt of the mixture of isomers was prepared in the usual manner and had M.P. 286–288° C. The pure trans dihydrochloride had M.P. 298–300° C. and the pure cis dihydrochloride had M.P. 232–234° C. Analysis of the dihydrochloride salts confirmed the empirical formula $C_{22}H_{30}N_2Cl_4$.

(b) To a solution of o-chlorobenzylamine (29.5 gm.) in benzene (250 ml.) was added portionwise, cyclohexane-trans-1,4-bicarbonylchloride (5.0 gm.), prepared from the corresponding acid and thionyl chloride. The mixture was refluxed for 3 hours then cooled. The precipitate was removed by filtration, triturated with water, dried and crystallized from dimethylformamide to yield the title product, M.P. 325–327° C., the impirical formula $C_{22}H_{24}N_2Cl_2O_2$, confirmed by analysis. The above diamide (1.0 gm.) was reduced with lithium aluminum hydride (1.0 gm.) in refluxing dioxane to yield trans-1,4-bis-(o-chlorobenzylaminomethyl)-cyclohexane, identical to that described above. The dihydrochloride salt was prepared in the usual manner and was identical to that described above.

(c) o-chlorobenzylamine (4.73 gm.) and trans-1,4-bis(methanesulfonylmethyl)-cyclohexane (9.0 gm.), prepared as described by Haggis and Owen in J. Chem. Soc. 1953, p. 404, were combined and heated at 130° C. for 6 hours. The mixture was cooled, dissolved in benzene and washed with dilute aqueous sodium hydroxide and extracted with dilute hydrochloric acid.

The acid extract was made alkaline with sodium hydroxide and extracted with benzene to yield the title compound identical to that obtained above. A dihydrochloride salt was prepared and crystallized from a methanol-ether mixture.

It was identical with that described above.

EXAMPLE 5

1,4-bis-(p-chlorobenzylaminomethyl)-cyclohexane 1,4-bis-(aminomethyl)-cyclohexane (0.1 mole) and p-chlorobenzaldehyde (0.2 mole) were refluxed in benzene for five hours. The solid Schiff base which formed was isolated by filtration, suspended in methanol, and treated portionwise with sodium borohydride (7.6 gm.). After three hours of refluxing, a homogeneous solution resulted. The title compound was isolated in the usual manner. It was a light yellow oil, $\lambda$ max. 262 m$\mu$, $\epsilon$=578; 268 m$\mu$, $\epsilon$=671; 277 m$\mu$, $\epsilon$=480.

The dihydrochloride, prepared in the usual manner, was crystallized from methanol-ether. It had M.P.>360° C. Analysis confirmed the empirical formula $$C_{22}H_{30}N_2Cl_4$$

EXAMPLE 6

*1,4-bis-(p-dimethylaminobenzylaminomethyl)-cyclohexane* p-Dimethylaminobenzaldehyde (0.2 mole) and 1,4-bis-(aminomethyl)-cyclohexane (0.1 mole) were refluxed in benzene to yield the Schiff base as a solid. It was suspended in methanol and treated portionwise with excess sodium borohydride. After refluxing for thirty minutes, the mixture became homogeneous. Working up the mixture as previously described yielded the title compound as a semi-solid, λ max. 263 mμ, ε=37,100; 305 mμ, ε=4,060. A tetrahydrochloride was prepared and crystallized from ethanol-ether. It had M.P.>360° C. Analysis confirmed the empirical formula $C_{26}H_{44}N_4Cl_4$

EXAMPLE 7

*1,4-bis-(m-chlorobenzylaminomethyl)-cyclohexane* m-Chlorobenzaldehyde (28.0 gm., 0.2 mole) and 1,4-bis-(aminomethyl)-cyclohexane (14.2 gm., 0.1 mole) were converted to the Schiff base in the usual manner. The solid Schiff base was suspended in methanol and treated portionwise with sodium borohydride (7.6 gm.). During the reaction the mixture became homogeneous and the title compound was obtained as an oil, λ max. 255 mμ, ε=526; 262 mμ, ε=628; 267 mμ, ε=764; 276 mμ, ε=610. It was converted to the dihydrochloride salt in the usual manner. It was crystallized from dilute ethanol and had M.P. 314–315° C. Analysis confirmed the empirical formula $C_{22}H_{30}N_2Cl_4$.

EXAMPLE 8

*1,4-bis-(p-methylbenzylaminomethyl)-cyclohexane*

1,4-bis-(aminomethyl)-cyclohexane (14.2 gm., 0.1 mole) and p-tolualdehyde (0.2 mole) were combined in benzene and refluxed until the theoretical quantity of water had been removed azeotropically. The benzene was removed and the resulting oil was dissolved in methanol and treated portionwise with sodium borohydride (7.6 gm.). The reduction product was worked up as previously described to yield the title compound as a yellow oil, λ max. 259 mμ, ε=506; 264 mμ, ε=631; 274 mμ, ε=532.

The dihydrochloride was prepared by treating the free base with ethereal hydrogen chloride. It was crystallized from a methanol-water mixture and had M.P. 357–358° C. Analysis confirmed the empirical formula $C_{24}H_{36}N_2Cl_2$

EXAMPLE 9

*1,4-bis-(p-acetamidobenzylaminomethyl)-cyclohexane* p-Acetamidobenzaldehyde (32.6 gm.) and 1,4-bis-(aminomethyl)-cyclohexane (14.1 gm.) were converted to the Schiff base in the manner described above. It was obtained as a solid and had bands in the infrared at 3400 cm.$^{-1}$; 1675 cm.$^{-1}$, and 1652 cm.$^{-1}$. The Schiff base (30.0 gm.) was dissolved in methanol and treated portionwise with sodium borohydride (7.5 gm.). After refluxing for three hours, the reaction was worked up in the usual manner to yield the title compound. It was a solid and had infra-red bands at 1605 cm.$^{-1}$ and 1665 cm.$^{-1}$. It showed absorption in the ultra-violet at λ max. 247 mμ, ε=35,800. A dihydrochloride was prepared with methanolic hydrogen chloride and was crystallized from water. It had M.P.>360° C. Analysis confirmed the empirical formula $C_{26}H_{38}N_4O_2Cl_2$.

EXAMPLE 10

*1,4-bis-(2-phenylpropylaminomethyl)-cyclohexane*

2-phenylpropionaldehyde (0.2 mole) and 1,4-bis-(aminomethyl)-cyclohexane (0.1 mole) were converted to the Schiff base after the method of Example 1. It was reduced with excess sodium borohydride to yield the title compound, λ max. 258 mμ (ε=480). Its dihydrochloride salt had M.P. 291–292° C. and its empirical formula, $C_{26}H_{40}N_2Cl_2$, was confirmed by analysis.

EXAMPLE 11

(a) *1,4-bis-(o-fluorobenzylaminomethyl)-cyclohexane*

Following the method of Example 1, 1,4-bis(aminomethyl)-cyclohexane (0.1 mole) and o-fluorobenzaldehyde (0.2 mole) were converted to the Schiff base, ν max. 1642 cm.$^{-1}$, which was reduced to the title compound with excess sodium borohydride. It had λ max. 263 mμ (ε=1810); dihydrochloride, M.P. 301–302° C. and was the pure trans isomer. Analysis confirmed the empirical formula $C_{22}H_{30}N_2F_2Cl_2$.

(b) Cis-1,4-bis-(aminomethyl)-cyclohexane (1 equivalent) and o-fluorobenzoyl chloride (2 equivalents) were converted to cis-1,4-bis-(o-fluorobenzoylaminomethyl)-cyclohexane under the conditions of the Schotten-Baumann reaction. It had M.P. 171.5–172.5° C. and its empirical formula $C_{22}H_{24}N_2O_2F_2$ was confirmed by analysis. It was reduced with excess of lithium aluminum hydride in tetrahydrofuran solution as described in Example 1b to yield the cis isomer of the title compound as an oil; dihydrochloride salt, M.P. 287–289° C., empirical formula $C_{22}H_{30}N_2F_2Cl_2$ confirmed by analysis.

EXAMPLE 12

*1,4-bis-(m-fluorobenzylaminomethyl)-cyclohexane*

Following the method of Example 1, 1,4-bis-(aminomethyl)-cyclohexane (1 equivalent) and m-fluorobenzaldehyde (2 equivalents) were converted to the corresponding Schiff base, γ max. 1646 cm.$^{-1}$, which was reduced with excess sodium borohydride to the title compound, λ max. 257 mμ (ε=1290); dihydrochloride, M.P. 336–337° C. Analysis confirmed the empirical formula $C_{22}H_{30}N_2F_2Cl_2$.

EXAMPLE 13

*1,4-bis-(p-fluorobenzylaminomethyl)-cyclohexane*

Following the method of Example 1, 1,4-bis-(aminomethyl)-cyclohexane (0.1 mole) and p-fluorobenzaldehyde (0.2 mole) were converted to the Schiff base, λ max. 246 mμ (ε=34,350). Reduction with excess sodium borohydride yielded the title compound, λ max. 246 mμ (ε=1,465); dihydrochloride, M.P. 364–365° C. Analysis confirmed the empirical formula $C_{22}H_{30}N_2F_2Cl_2$.

EXAMPLE 14

*1,4-bis-(o-bromobenzylaminomethyl)-cyclohexane*

1,4-bis-(aminomethyl)-cyclohexane (1 equivalent) and o-bromobenzaldehyde (2 equivalents) were converted to the Schiff base as described in Example 1. It had M.P. 102–106° C. and was reduced with an excess of sodium borohydride to yield the title compound, M.P. 117–121° C.; dihydrochloride salt, M.P. 274–275° C. as a mixture of cis and trans isomers. The pure trans dihydrochloride had M.P. 286–288° C. and the pure cis dihydrochloride had M.P. 218–220° C. Analysis confirmed the empirical formula $C_{22}H_{30}N_2Br_2Cl_2$.

EXAMPLE 15

*1,4-bis(o-chlorobenzylamino-2-ethyl)-cyclohexane*

1,4-diacetylcyclohexane (3.0 gm., 0.018 mole) (M.P. 57–58.5° C., prepared by a conventional procedure from cyclohexane-1,4-dicarbonitrile by a Grignard reaction with methylmagnesium bromide followed by acid hydrolysis of the resulting ketimine) and o-chlorobenzylamine (5.2 gm., 0.037 mole) were converted to the Schiff base by the standard procedure. It was crystallized from acetone and had M.P. 108–110° C. 2.1 gm. of the Schiff base (0.0051 mole) was reduced in methanol solution with excess sodium borohydride (400 mg., 0.0105 mole)

to yield the title compound as an oil. The dihydrochloride salt was prepared and crystallized from methanol. It had M.P. 308–310° C. dec. Analysis confirmed the empirical formula $C_{24}H_{34}N_2Cl_4$.

EXAMPLE 16

*1,4-bis-(m-bromobenzylaminomethyl)-cyclohexane*

Following the procedure of Example 1, 1,4-bis-(aminomethyl)-cyclohexane (0.1 mole) and m-bromobenzaldehyde (0.2 mole) were converted to the corresponding Schiff base, λ max. 247 mμ (ε=29,400). Reduction with excess sodium borohydride yielded the title compound, λ max. 253 mμ (ε=448), 267 mμ (ε=552), 276 mμ (ε=387); dihydrochloride salt, M.P. 312° C. Analysis confirmed the empirical formula $C_{22}H_{30}N_2Br_2Cl_2$.

EXAMPLE 17

*1,4-bis-(p-bromobenzylaminomethyl)-cyclohexane*

Following the procedure of Example 1, 1,4-bis-(aminomethyl)-cyclohexane and p-bromobenzaldehyde were converted to the Schiff base, M.P. 120° C., which was reduced with sodium borohydride to yield the title compound, λ max. 261 mμ (ε=815); dihydrochloride melting above 360° C. Analysis confirmed the empirical formula $C_{22}H_{30}N_2Br_2Cl_2$.

EXAMPLE 18

*1,4-bis-(o-hydroxybenzylaminomethyl)-cyclohexane*

Salicylaldehyde (0.2 mole) and 1,4-bis-(aminomethyl)-cyclohexane (0.1 mole) were converted to the Schiff base, M.P. 117–119° C., which was reduced with excess sodium borohydride after the method of Example 1, to yield the title compound, M.P. 146–149° C., empirical formula $C_{22}H_{30}N_2O_2$ confirmed by analysis. The diacetate salt had M.P. 195–196° C.

EXAMPLE 19

*1,4-bis-(o-nitrobenzylaminomethyl)-cyclohexane*

Following the procedure of Example 1, o-nitrobenzaldehyde (0.2 mole) and 1,4-bis-(aminomethyl)-cyclohexane (0.1 mole) were converted to the corresponding Schiff base, M.P. 148–155° C. Reduction with excess sodium borohydride yielded the title compound, M.P. 105–108° C.; dihydrochloride salt, M.P. 259–260° C., empirical formula $C_{22}H_{30}N_4O_4Cl_2$ confirmed by analysis.

EXAMPLE 20

*1,4-bis-(o-aminobenzylaminomethyl)-cyclohexane*

The Schiff base from o-nitrobenzaldehyde and 1,4-bis-(aminomethyl)-cyclohexane (44.9 gm.), M.P. 148–155° C., described in Example 19, was hydrogenated in ethanol solution in the presence of a Raney nickel catalyst (4.5 gm.) to yield the corresponding o-amino Schiff base, λ max. 228 mμ (ε=25,000), 293 mμ (ε=2,790) and 350 mμ (ε=4,220). It was reduced with excess sodium borohydride to yield the title compound as an oil, B.P. 260° C./0.5 mm.; λ max. 236 mμ (ε=14,200) and 290 mμ (ε=4,120). Its di-acid maleate salt had M.P. 194° C. dec. and its empirical formula $C_{30}H_{40}N_4O_8$ was confirmed by analysis.

EXAMPLE 21

*Trans-1,4-bis-(o-trifluoromethylbenzylaminomethyl)-cyclohexane* o-Trifluoromethylbenzaldehyde (2.4 gm.), B.P. 28–38° C. (0.3–0.6 mm.), ν max. 1700 cm.⁻¹, prepared by lithium tri-(t-butoxy) aluminum hydride reduction of the corresponding acid chloride, and trans-1,4-bis-(aminomethyl)-cyclohexane (1.0 gm.) were converted to the Schiff base by the process used in Example 1. It had M.P. 98–106° C. and on reduction with excess sodium borohydride, the title compound was obtained, M.P. 93–98° C. Its dihydrochloride salt had M.P. 265–269° C. and its empirical formula $C_{24}H_{30}N_2Cl_2F_6$ was confirmed by analysis. In a similar manner, the trichloromethyl and tribromomethyl derivatives, i.e., 1,4-bis-(o-trichloromethylbenzylaminomethyl)-cyclohexane and 1,4-bis-(o-tribromomethylbenzylaminomethyl)-cyclohexane are prepared.

EXAMPLE 22

*1,4-bis-(o-methylthiobenzoylaminomethyl)-cyclohexane* o-Methylthiobenzoylchloride (94.3 gm.), M.P. 76–79° C., ν max. 1765 cm.⁻¹ and 1725 cm.⁻¹, prepared from the corresponding carboxylic acid with thionyl chloride, and 1,4-bis-(aminomethyl)-cyclohexane (35.5 gm.) were converted to the title compound using the conditions of the Schotten-Baumann reaction. The diamide had M.P. 172–173° C. on crystallization from aqueous ethanol and its empirical formula $C_{24}H_{30}N_2O_2S_2$ was confirmed by analysis.

EXAMPLE 23

*1,4-bis-(o-methylthiobenzylaminomethyl)-cyclohexane*

The diamide of Example 22 (52.7 gm.) was reduced by refluxing in dioxane solution with excess lithium aluminum hydride (9.1 gm.) to yield the title compound as a light yellow oil. Its dihydrochloride, crystallized from a methanol-ether mixture, had M.P. 271–272° C. and its empirical formula $C_{24}H_{36}N_2S_2Cl_2$ was confirmed by analysis.

I claim:
1. A compound selected from the group consisting of bases of the formula:

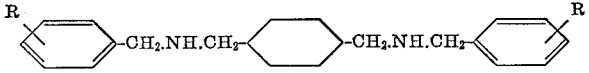

wherein R is selected from the group consisting of nitro, trifluoromethyl and methylthio, and acid addition salts of said bases with hydrochloric acid.

2. 1,4-bis-(o-nitrobenzylaminomethyl)-cyclohexane.
3. The dihydrochloride salt of 1,4-bis-(o-nitrobenzylaminomethyl)-cyclohexane.
4. 1,4-bis-(o-trifluoromethylbenzylaminomethyl)-cyclohexane.
5. The dihydrochloride salt of 1,4-bis-(o-trifluoromethylbenzylaminomethyl)-cyclohexane.
6. 1,4-bis-(o-methylthiobenzylaminomethyl)-cyclohexane.
7. The dihydrochloride salt of 1,4-bis-(o-methylthiobenzylaminomethyl)-cyclohexane.

References Cited by the Examiner

FOREIGN PATENTS 605,034  9/60  Canada.

CHARLES B. PARKER, *Primary Examiner.*

IRVING MARCUS, *Examiner.*